United States Patent
Eppensteiner et al.

(10) Patent No.: US 10,133,881 B2
(45) Date of Patent: Nov. 20, 2018

(54) METHOD AND CIRCUIT ARRANGEMENT FOR PROTECTING AGAINST SCANNING OF AN ADDRESS SPACE

(71) Applicant: Siemens AG Oesterreich, Vienna (AT)

(72) Inventors: Friedrich Eppensteiner, Spitz (AT); Majid Ghameshlu, Vienna (AT); Herbert Taucher, Meodling (AT)

(73) Assignee: Siemens AG Österreich, Vienna (AT)

( * ) Notice: Subject to any disclaimer, the term of this patent is extended or adjusted under 35 U.S.C. 154(b) by 65 days.

(21) Appl. No.: 14/913,206

(22) PCT Filed: Jul. 17, 2014

(86) PCT No.: PCT/EP2014/065391
§ 371 (c)(1),
(2) Date: Feb. 19, 2016

(87) PCT Pub. No.: WO2015/024716
PCT Pub. Date: Feb. 26, 2015

(65) Prior Publication Data
US 2016/0203341 A1     Jul. 14, 2016

(30) Foreign Application Priority Data
Aug. 22, 2013 (DE) .......... 10 2013 216 699

(51) Int. Cl.
*G06F 21/75* (2013.01)
*G06F 13/364* (2006.01)
(Continued)

(52) U.S. Cl.
CPC ............ *G06F 21/75* (2013.01); *G06F 13/364* (2013.01); *G06F 13/4282* (2013.01); *G06F 21/76* (2013.01); *G06F 21/85* (2013.01)

(58) Field of Classification Search
USPC ......................................... 726/23
See application file for complete search history.

(56) References Cited

U.S. PATENT DOCUMENTS 5,526,503 A * 6/1996 Kim ............... G06F 11/261
711/100
5,699,514 A * 12/1997 Durinovic-Johri ..... G06F 21/31
340/5.31

(Continued)

FOREIGN PATENT DOCUMENTS

EP    1619572 A1   1/2006
EP    2472408 A1   7/2012

OTHER PUBLICATIONS

Search Report dated Dec. 12, 2016 which issued in the corresponding German Patent Application No. 102013216699.0.

*Primary Examiner* — Taghi T Arani
*Assistant Examiner* — Badri Narayanan Champakesan
(74) *Attorney, Agent, or Firm* — Cozen O'Connor

(57) ABSTRACT

A circuit arrangement and method for securing an integrated electronic circuit against scans of an address space, wherein the circuit arrangement has at least one master unit and at least one slave unit interconnected via a bus system for access of the master unit to the slave unit, and addresses are used from an address space that is allocated and used in accordance with functionalities of the integrated electronic circuit, where a defense slave unit is connected to the bus system, access to unused address regions of the address space are forwarded to the defense slave unit, the access is analyzed and evaluated by the defense slave unit and depending on an analysis result and the respective access type, defensive measures are triggered, such that address space scans are interrupted or a potential scan result is rendered useless in a simple manner.

13 Claims, 2 Drawing Sheets

(51) Int. Cl.
*G06F 13/42* (2006.01)
*G06F 21/76* (2013.01)
*G06F 21/85* (2013.01)

(56) References Cited

U.S. PATENT DOCUMENTS

| | | | | |
|---|---|---|---|---|
| 6,363,444 B1* | 3/2002 | Platko | G06F 13/28 | 709/208 |
| 6,598,138 B1* | 7/2003 | Marik | G06F 13/1605 | 711/154 |
| 7,539,828 B2* | 5/2009 | Lomnes | G06F 21/80 | 711/163 |
| 7,539,833 B2* | 5/2009 | Krauss | G06F 11/3612 | 711/100 |
| 7,827,333 B1* | 11/2010 | Wyatt | G06F 12/0653 | 710/104 |
| 7,926,104 B1* | 4/2011 | Sundaram | H04L 63/108 | 709/245 |
| 8,220,045 B2* | 7/2012 | Conti | G06F 21/554 | 726/17 |
| 8,490,191 B2* | 7/2013 | Kuegler | G06F 21/123 | 713/156 |
| 8,881,282 B1* | 11/2014 | Aziz | G06F 21/554 | 726/23 |
| 8,949,474 B1* | 2/2015 | Swarbrick | G06F 12/10 | 709/218 |
| 2002/0188610 A1* | 12/2002 | Spencer, Jr. | G06F 17/30893 | |
| 2005/0015689 A1* | 1/2005 | Eppensteiner | G01R 31/31858 | 714/724 |
| 2005/0229254 A1* | 10/2005 | Singh | G06F 21/55 | 726/23 |
| 2006/0036851 A1* | 2/2006 | DeTreville | G06F 9/4406 | 713/159 |
| 2007/0205974 A1* | 9/2007 | Iizuka | G09G 3/3648 | 345/98 |
| 2008/0016313 A1* | 1/2008 | Murotake | G06F 12/1416 | 711/173 |
| 2009/0287871 A1* | 11/2009 | Zhang | G06F 13/28 | 710/308 |
| 2011/0225651 A1* | 9/2011 | Villasenor | G06F 21/85 | 726/22 |
| 2012/0131673 A1* | 5/2012 | Caci | G06F 21/86 | 726/23 |
| 2012/0331308 A1* | 12/2012 | Fernandez Gutierrez | G06F 21/71 | 713/190 |
| 2013/0036465 A1* | 2/2013 | Chuan | G06F 21/85 | 726/22 |
| 2013/0047250 A1* | 2/2013 | Kothari | H03K 3/0315 | 726/16 |
| 2013/0191651 A1* | 7/2013 | Muff | G06F 12/1027 | 713/193 |
| 2013/0291110 A1* | 10/2013 | Thadikaran | G06F 21/78 | 726/23 |
| 2014/0317742 A1* | 10/2014 | Edwards | G06F 21/56 | 726/23 |
| 2016/0021121 A1* | 1/2016 | Cui | H04L 63/145 | 726/1 |

* cited by examiner

METHOD AND CIRCUIT ARRANGEMENT FOR PROTECTING AGAINST SCANNING OF AN ADDRESS SPACE

CROSS-REFERENCE TO RELATED APPLICATIONS

This is a U.S. national stage of application No. PCT/EP2014/065391 filed 17 Jul. 2014. Priority is claimed on German Application No. 10 2013 216 699.0 filed 22 Aug. 2013, the content of which is incorporated herein by reference in its entirety.

BACKGROUND OF THE INVENTION

1. Field of the Invention

The present invention relates generally to the field of electronic and logic circuits, in particular integrated electronic circuits such as application-specific integrated circuits (ASICs) or field programmable gate arrays (FPGAs) and, more specifically, to a method and circuit arrangement for protecting integrated circuits, such as ASICs, FPGAs, particularly in the form of system-on-chip devices, against scanning of an address space, which integrated circuit comprises at least one master device, at least one slave device and a bus system for a connection between master device and slave device where accesses between the master device and slave device occur via the bus system using an address from the address space, and where the address space is allocated or used in accordance with the intended functions of the integrated circuit.

2. Description of the Related Art

Today, particularly in computer technology, every kind of electronic system is based on logic circuits or electronic circuits, which are often implemented as what are known as integrated (electronic) circuits (ICs). Integrated electronic circuits consist of an electronic circuit composed of interconnected electronic components and accommodated on a single substrate, usually a semiconductor substrate. An integrated electronic circuit generally comprises a large number of different components and connecting conductor tracks on/in a semiconductor substrate or single-crystal substrate, i.e., the chip. This integration has made it possible to provide and implement technically a large range of applications and functions in a small space and, hence, to reduce the size of the circuits considerably for use in, for instance, mobile devices, Subscriber Identity Module (SIM) cards, Radio Frequency Identification (RFIDs), smartphones and many other electrical and/or electronic devices.

If such integrated electronic circuits are created for specific applications, then they are known as application-specific integrated circuits (ASICs). The functions of an ASIC are explicitly specified during design, development and fabrication and hence permanently defined. In other words, it should no longer be possible to modify the specified functions. There are, however, numerous ASICs in which microprocessors, signal processors etc. are integrated, thereby allowing a certain amount of flexibility to be achieved by applications running therein in the form of software.

Field programmable gate arrays (FPGAs) are another form in which integrated electronic circuits are used. In these devices, a logic circuit can be programmed by defining function structures and, by specifying configuration rules. This involves using a hardware description language or circuit diagrams, for instance, to create circuit structures in an FPGA and then downloading this data for configuring the FPGA to the chip. Unlike ASICs, this programming allows different circuits to be implemented in one FPGA, i.e., the circuit in an FPGA, for instance, can also be modified by a user, or implemented functions can be changed, improved or expanded at a later point in time. FPGAs are used, for example, to implement devices ranging from simple synchronous counters to highly complex circuits, such as microprocessors. Thus, the function of the FPGA is defined by the particular configuration downloaded to the chip.

Thanks to continued miniaturization and a constantly increasing level of integration, entire systems comprising, for instance, processors, controllers, memory modules (e.g., ROMs, or RAMs) power management and other components, are now accommodated on one chip or die. Such systems are also referred to as a system on chip (SoC). These system-on-chip devices are mainly used in applications in which small dimensions are required together with relatively high performance and a range of functions (e.g., mobile communications sector, smartphones, or embedded computers). With a system on chip, all or most of the functions of the system, for instance in the form of hardware components (e.g., physical components, processor units, memory devices, or input/output devices) and/or software components (e.g., software applications, or programs), are accommodated in an integrated electronic circuit on one chip, with the system components being connected via mostly hierarchical or at least segmented bus systems.

What is known as the master/slave model is often used for organizing and distributing functions, such as accesses and tasks, between the functional units or components in complex integrated circuits, in particular in a system on chip. In this model, the various tasks are distributed between higher-level components, the "master" devices, devices such as processor units, or controllers, and lower-level components, the "slave" devices, (e.g., memory devices, input/output devices, or special processors), and accesses to shared resources (e.g., bus systems, or memory devices) are organized in a controlled manner. A master/slave model is used, for example, when one or more components or master devices assume control of other components or slave devices, or when accesses, such as access to the bus system or memory devices, need to be controlled.

With integrated electronic circuits such as ASICs, or FPGAs, and, in particular, with system-on-chip devices, there is frequently a large dependency between the data to be processed, allocation of address areas in an address space, by which, for instance, accesses to memory devices and thereby to hardware and/or software components are defined, and the functions and applications implemented in the circuit. By knowing this information (e.g., where, in the address space, e.g., data or software components such as program codes, are located which address areas of the address space are unused for instance, etc.), it is possible to infer, for instance, the functions and the configuration of the circuit and hence, for example, to perform targeted hacker attacks to compromise and/or tamper with the circuit or to gain access to required and/or protected data.

Integrated electronic circuits may have, for example, safety and/or security functions as software components, which protect the circuit concerned from unauthorized accesses, or tampering, for instance, in particular during operation. These functions, however, are not enabled for ongoing operation until a start-up procedure or boot-up stage for the circuit. The integrated electronic circuit, itself as an electronic chip normally, is not equipped with functions for protecting the circuit from attacks, such as attacks made by programs loaded externally onto the circuit chip (e.g., malware), or from spying or scanning of the address space (e.g., of processors embedded in the circuit, or address mappings in the bus system). Here, an address space of the circuit denotes a set of addresses, such as for accesses between components of the circuit (e.g., master devices, or slave devices), which can each be addressed explicitly and in a standard manner. Knowledge of used and unused addresses in the address space of the circuit, for instance, can thus be employed for what is known as reverse engineering. When scanning the address space of the circuit, successive write and/or read accesses to consecutive addresses are used, for example, in an attempt to draw conclusions about an inner life, i.e., about the configuration and functions, of the circuit. The information gathered from the scan, such as information about the usage of the address space, can then be used, for example, for targeted hacker attacks, for unauthorized reverse engineering of the existing circuit and/or for gaining access to sensitive data in the circuit.

SUMMARY OF THE INVENTION

Accordingly, it is an object of the present invention to provide a method and circuit arrangement by which scanning of an address space of an integrated electronic circuit can be impeded in a simple way, and by which the ability to derive the structure or functions of the circuit from a result of the address-space scan is prevented.

These and other objects and advantages are achieved in accordance with the invention by providing a circuit arrangement and method in which a defense slave device is provided in the integrated electronic circuit and is connected to the bus system of the circuit. Accesses to unused addresses and/or address areas of the address space of the circuit or of its master devices are routed to the defense slave device. These accesses are then analyzed and evaluated by the defense slave device, which initiates suitable defensive measures in accordance with an analysis result and a type of access (e.g. read access, or write access) for the unauthorized access concerned.

The main aspect of the method in accordance with the invention is that accesses to unused addresses or address areas are not terminated in the bus system of the circuit and by an error message, but at the defense slave device connected to the bus system. Accordingly, accesses can be suitably analyzed and evaluated. Unused addresses or address areas are not normally accessed by software components or by product software in the integrated electronic circuit. As a result, it is thereby possible to detect scans of the address space easily and quickly, such as based on a large number of accesses to unused address area in a relatively short time or based on specific patterns in write accesses (e.g., data to be written is incremented). In addition, suitable defensive measures can be initiated rapidly against the scan of the address space, thereby stopping information from being gathered about the circuit functions. These defensive measures are aimed at impeding hacking of the integrated electronic circuit. The address-space scan provides no information or no analyzable information or falsified information from which it is not possible or no longer possible to ascertain the circuit functions.

Here, it is advantageous if, for an analysis of the accesses to unused addresses or address areas, the defense slave device evaluates a number of accesses to unused addresses, a number of accesses within a defined time period and/or evaluates patterns of accesses. It is thereby extremely easy, for example, to distinguish erroneous accesses to unused addresses as a result of a software error, such as one or only a very few accesses, from genuine scanning of the address space, i.e., for example, systematic access sequences of read and/or write accesses to consecutive addresses using a large number of accesses. It is also possible to detect address-space scans very easily and quickly based on the number of accesses to unused addresses within a defined time interval. In addition, address-space scans can also be identified by specific patterns in the accesses. As a result of the evaluation by the defense slave device of the accesses, the defensive measures are initiated only for an address-space scan but not, for instance, for accesses resulting from software errors.

During a start-up procedure or boot-up stage of the integrated electronic circuit, it is advantageous if, based on the analysis result or on detecting an address-space scan, the integrated electronic circuit is returned to a defined initial state during this stage as a defensive measure. In other words, a message from the defense slave device, for instance, or the defense slave device triggers a reset of the integrated electronic circuit, which resets the circuit and hence terminates the address-space scan or an unauthorized program executing said scan (e.g., malware, or modified software). This defensive measure can be enabled, for example, only in the boot-up stage of the integrated circuit, and once boot-up is completed successfully without unauthorized attack can be disabled so that any accesses that may be contained in the product software of the circuit do not trigger this measure, in other words do not unintentionally trigger the circuit reset.

During operation of the integrated electronic circuit, it is recommended that based on the analysis result or on detecting an address-space scan, as defensive measures the defense slave device sends messages to master and/or slave devices in the form of interrupt requests or specific reset requests that can be recognized by the particular application, function or product software. The interrupt request, for instance, can interrupt a currently running software component of the circuit (e.g., a program for, or containing, the address-space scan) in order to perform a predefined interrupt routine, such as to disrupt the address-space scan. The specific reset request can be used, for example, to reset and terminate a running software component and hence the address-space scan. It is also possible, however, that on detecting an address-space scan, specific functions of the circuit (e.g., functions that are particularly worth protecting or are particularly sensitive) are disabled by a message from the defense slave device, for example.

It is also advantageous if as a defensive measure, the defense slave device responds to accesses to unused addresses according to the particular type of access (e.g., read access, write access). In this case, the defense slave device can respond to read accesses to unused addresses using randomly generated data. Data from write accesses are ignored, for instance, or this data is used to respond to subsequent read accesses to unused addresses. It is also possible for accesses to unused addresses to simulate, for instance, a virtual interface that does not exist in the circuit, such as a RAM or universal asynchronous receiver transmitter (UART), which is used in an electronic circuit to implement digital serial interfaces. When simulating a UART, it is also possible, for instance, for registers of a UART functional unit to be inserted in the unused address area and returned, thereby simulating a false function of the circuit. In addition, during read and/or write accesses, sensitive data, such as start-up sequences in a memory device or in a memory area of the circuit can be deleted, thereby placing the integrated circuit permanently in an inactive state.

Responding to the accesses with random or false data or simulating non-existent functions means that it is no longer possible to obtain from the address-space scan any information or any analyzable information about the configuration and functions of the circuit being spied upon. Hence, it is no longer possible to reconstruct which address areas of the address space are unused or how they are used. This significantly impedes hacker attacks on the integrated circuit and makes reverse engineering impossible on the basis of an address-space scan.

The object is also achieved by a circuit arrangement for implementing the method in accordance with the invention. In addition to at least one master device, at least one slave device and a bus system for a connection between the at least one master device and the at least one slave device, the circuit arrangement comprises a defense slave device, which is connected to the bus system and to which can be routed accesses to unused addresses or address areas of the address space. The defense slave device is also configured to analyze and evaluate accesses to unused addresses or address area, and to bring about and initiate defensive measures according to a particular analysis result and according to a type of access (e.g., read access, or write access).

The advantages achieved by the circuit arrangement in accordance with the invention are primarily that it is easily and quickly possible to detect scans of the address space and to implement suitable countermeasures or defensive measures that impede and hinder an address-space scan or that render any information about the integrated electronic circuit that was ascertained from the address-space scan worthless. By adding a defense slave device to the circuit in the circuit arrangement in accordance with the invention, accesses to unused addresses or address areas are no longer terminated in the bus system, such as via an interrupt request to the accessing component, but instead these accesses are routed to the defense slave device. The accesses to the unused addresses are then analyzed and evaluated here, whereby it is possible to establish very quickly an address-space scan, such as based on frequent and systematic accesses to unused addresses. For this purpose, the number of these accesses, the number of these accesses within a defined time interval or patterns in these accesses, such as data being incremented in successive write accesses, can be analyzed and evaluated. The defense slave device is then configured to initiate suitable defensive measures on detecting an address-space scan.

For this purpose, it is advantageous if the defense slave device is configured to send messages in the form of interrupt requests or specific reset requests or to disable functions as defensive measures. In addition, the defense slave device is configured to reset the integrated electronic circuit to a defined initial state as a defensive measure if in a start-up procedure or boot-up stage an address-space scan is identified. Software components, for instance, which may contain a scan program, for example, are thereby interrupted or terminated both while the integrated circuit is running and during start-up of the integrated circuit. An address-space scan is hence terminated, and the information obtained by the scan about unused addresses and/or address areas, for instance, is incomplete.

In addition, it is also advantageous if the defense slave device comprises means for responding to accesses in accordance with the particular type of access (e.g., read access, or write access), or for accesses to unused addresses or address areas of the address space is designed to simulate virtual interfaces. The defense slave device can cause, for example, randomly generated data to be returned when there is a read access to an unused address. For write accesses to unused addresses, the data to be written is ignored, for example, or used for a response to the next read access, such as in incremented form. Another option as a response to accesses to unused addresses or address area, is to simulate a virtual interface (e.g. RAM, or UART), which is inserted for these addresses or for this address area. Such measures provide a simple way to falsify the information that can be obtained by an address-space scan and thereby render the information worthless for reverse engineering and hacker attacks, for example, because it is no longer possible to detect which addresses or address areas in the integrated electronic circuit are actually unused.

There is also another option that when there are read and/or write accesses to unused addresses and an address-space scan is detected, the defense slave device deliberately causes sensitive data to be deleted. The integrated circuit can hence be placed in a permanently inactive state, such as by destroying a boot-up sequence in the relevant memory device. This procedure can be used, for example, in particularly sensitive circuits as protection against reverse engineering to prevent any information about the circuit being obtained by address-space scans.

Ideally, what is known as a network-on-chip bus system is used as the bus system in the circuit arrangement in accordance with the invention. In a network-on-chip bus system, the information and data is exchanged between the individual components of the integrated circuit (e.g., processors, controllers, input/output devices, or memory devices) via a hierarchical bus architecture. A network-on-chip bus system is structured like a network containing distribution points. In this system, information or accesses from one component to another component of the circuit can be switched as a point-to-point connection or as a multipath connection over a plurality of links, and can work, for example, like routing in a packet switched network. A network-on-chip bus system is hence one approach for developing and implementing flexible and efficient communications links within an integrated circuit, in particular within a system on chip. An information transfer or accesses can be performed more quickly and more efficiently via a network-on-chip system. Hence, unauthorized accesses to unused addresses or address areas are also routed more quickly to the defense slave device, and an address-space scan is detected more quickly.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained below by way of example with reference to the accompanying figures, in which.

DETAILED DESCRIPTION OF THE EXEMPLARY EMBODIMENTS

Figure 1:
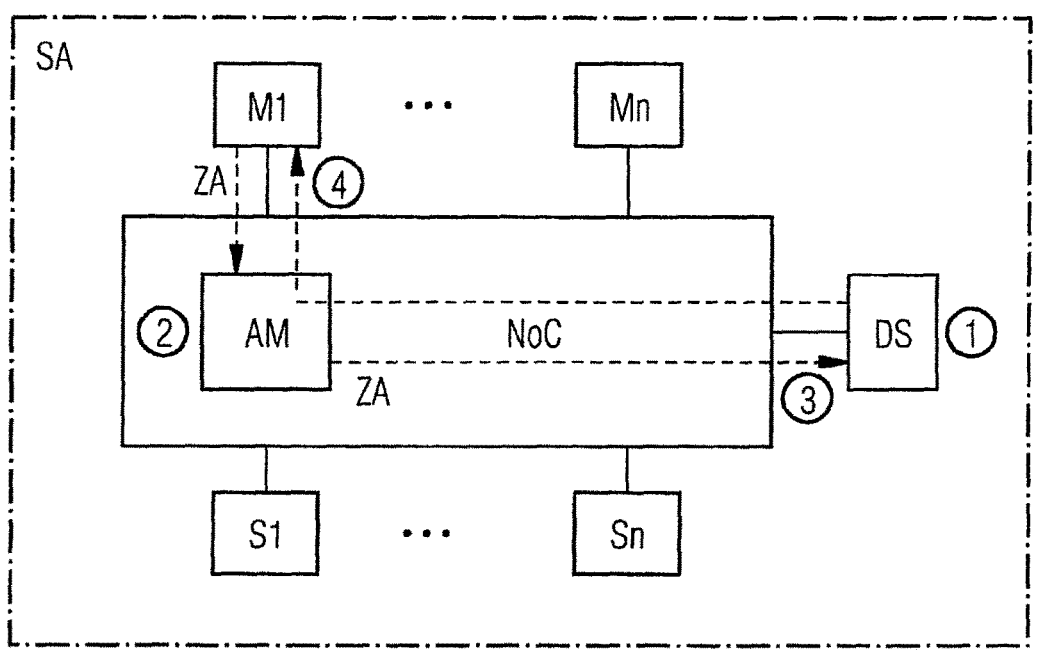
FIG. 1 shows schematically an exemplary circuit arrangement for implementing a method for protecting an integrated electronic circuit against scanning of an address space and execution of the method in accordance with the invention.

FIG. 1 shows schematically an exemplary circuit arrangement SA for implementing the method in accordance with the invention for protecting an integrated electronic circuit against scanning of an address space of this circuit. The circuit arrangement in accordance with the invention comprises at least one master device M1 to Mn, e.g., devices such as processors, controllers, or special processors, and at least one slave device S1 to Sn, e.g., devices such as memory devices, or input/output devices. In addition, the circuit arrangement SA in accordance with the invention comprises a bus system NoC, which is, for example, a standard product available on the market for bus systems, i.e., a network-on-chip bus system.

The at least one master device M1 to Mn is connected to the at least one slave device S1 to Sn via the bus system NoC. The exemplary circuit arrangement SA shown in FIG. 1 comprises a plurality of master devices M1 to Mn and a plurality of slave devices S1 to Sn. In addition, a defense slave device DS is connected to this bus system NoC.

During execution of applications and functions or of software components (e.g., product software) of the integrated electronic circuit, a master device M1 to Mn performs accesses ZA to one or more slave devices S1 to Sn via the bus system NoC via addresses, and/or slave devices S1 to Sn return information and/or data, or messages to the respective master devices M1 to Mn via the bus system NoC by means of addresses. In this process, address mapping AM is performed in the bus system NoC, and is used, for example, during an access, to translate an address of a master device M1 to Mn to the address of the relevant slave device S1 to Sn within the address space.

Here, a set of addresses which can be used, for example, to address uniquely other devices M1 to Mn and S1 to Sn of the integrated electronic circuit and to manage memory devices, forms the address space of this circuit. The address space is used in accordance with the functions of the integrated electronic circuit, i.e., there are allocated and unallocated addresses. If now, for example, as a result of an error in an application or function of the integrated electronic circuit, access is made to an unused address, then an interrupt request in the bus system NoC is normally used to notify the relevant application or function of this access ZA.

In the circuit arrangement SA in accordance with the invention, however, the defense slave device DS is provided, to which accesses ZA to unused addresses or address areas can be routed via the bus system NoC by the address mapping AM. The defense slave device DS then analyses and evaluates these accesses ZA to identify thereby, for instance, systematic or frequently occurring accesses ZA to unused addresses, and hence to detect what is known as an address-space scan. For this purpose it is possible to evaluate, for example, a number of the accesses ZA to unused addresses, a number of the accesses ZA within a defined time period or to evaluate patterns of accesses ZA (e.g., for write accesses).

In an address-space scan, a piece of malware loaded into the circuit, for instance, uses successive read and/or write accesses to consecutive addresses of the integrated circuit to scan the address space in order to identify information, such as unused areas, areas containing program code, or areas containing data, and to use this information, for example, for reverse engineering and/or hacker attacks. This means that in an address-space scan, numerous accesses ZA are made to unused addresses, such as systematically, and usually within a short time period. Specific patterns (e.g., write data being incremented) are often used in write accesses for instance.

This can be used by the defense slave device to detect an address-space scan and, for instance, to distinguish this scan from an access ZA to an unused address by a software error. If the defense slave device DS detects address-space scans, the defense slave device DS is configured to initiate defensive measures and/or to handle and respond to accesses to unused addresses.

To perform the method in accordance with the invention for protecting an integrated electronic circuit against scanning of the address space, in a first method step 1, the defense slave device DS is connected to the bus system NoC of the circuit. If, for instance, a piece of malware has now been loaded onto a first master device M1, which malware scans the address space of the integrated circuit and uses accesses ZA to access unused addresses or address areas systematically, then in a second method step 2, the address mapping AM of the bus system NoC routes to the defense slave device DS the accesses ZA to unused addresses or address areas.

In a third method step 3, the defense slave device DS then analyses and evaluates the accesses ZA in order to detect an address-space scan and to distinguish said scan from occasional, erroneous accesses ZA to unused addresses. In this case, the defense slave device DS can evaluate the accesses ZA against criteria such as, for instance, the number of the accesses ZA or the number of accesses ZA within a defined time interval. It can also examine whether specific patterns can be recognized in the accesses ZA, for instance systematic write accesses to unused addresses using incremented write data, etc.

If in the third method step 3 an address-space scan is identified, then in a fourth method step 4 the defense slave device can initiate or implement various defensive measures in order, for instance, to terminate or impede the address-space scan or to render the information obtained thereby worthless. It is possible in this case, such as during a start-up procedure or boot-up of the circuit, for the defense slave device DS to trigger a reset of the circuit. In other words, the integrated circuit is thereby reset into a defined initial state, and all running applications, functions, or programs are terminated. Here, it is possible, however, that if, for instance, other defense mechanisms implemented in the circuit are enabled, then this defensive measure is disabled when the integrated circuit is running to avoid unintentionally triggering a reset of the entire circuit by accesses made from programs, applications, or functions that are intended to be implemented in the circuit.

While the circuit is running, if an address-space scan is detected in the third method step 3, for instance, then the defense slave device DS can send a message in the form of an interrupt request or a specific reset request to the first master device M1, or more precisely to the malware running thereon, in the fourth method step 4. This interrupts or terminates the malware, for instance. There is also the option, however, that in the fourth method step 4, initiated by the defense slave device DS, specific functions of the integrated circuit are disabled.

It is also possible in the fourth method step 4 that when an address-space scan is detected, the defense slave device DS responds to or processes the accesses ZA to unused addresses, for example, in accordance with a type of access (e.g., read access, or write access). Thus, for instance, for read accesses ZA, random data, which has been generated by a linear feedback shift register, for example, can be returned. A linear feedback shift register can normally be used to generate strongly deterministic pseudorandom number sequences. Write accesses ZA to unused addresses can be ignored, for instance. There is also the option, however, that the data in such write accesses ZA is returned in subsequent read accesses to unused addresses, for example, in a modified form produced by incrementing.

It is also possible in the fourth method step 4, as a defensive measure for accesses ZA to unused addresses or address areas, to simulate a virtual interface, such as a RAM or addressable memory or a universal asynchronous receiver transmitter (UART), which is used to implement digital serial interfaces. When simulating a UART, registers of electronic circuits or prefabricated components or component elements, such as the ARM-PL011-UART, can be inserted in the unused address area. These defensive measures, which can also be combined with the other defensive measures, such as triggering an interrupt or a specific reset, are a simple way of falsifying the information in the address-space scan and hence making the information worthless, because it is no longer possible to detect unused addresses or address area of the address space.

In addition, it is also possible that when an address-space scan is detected, the integrated electronic circuit is placed in a permanent inactive state in the fourth method step 4. This is achieved, for instance, by deleting sensitive data (e.g., boot sequences in a memory area of the circuit). It is then no longer possible to boot up the circuit and hack the circuit for instance. This defensive measure can be applied, for example, to particularly sensitive circuits whose design and configuration require special protection.

Figure 2:
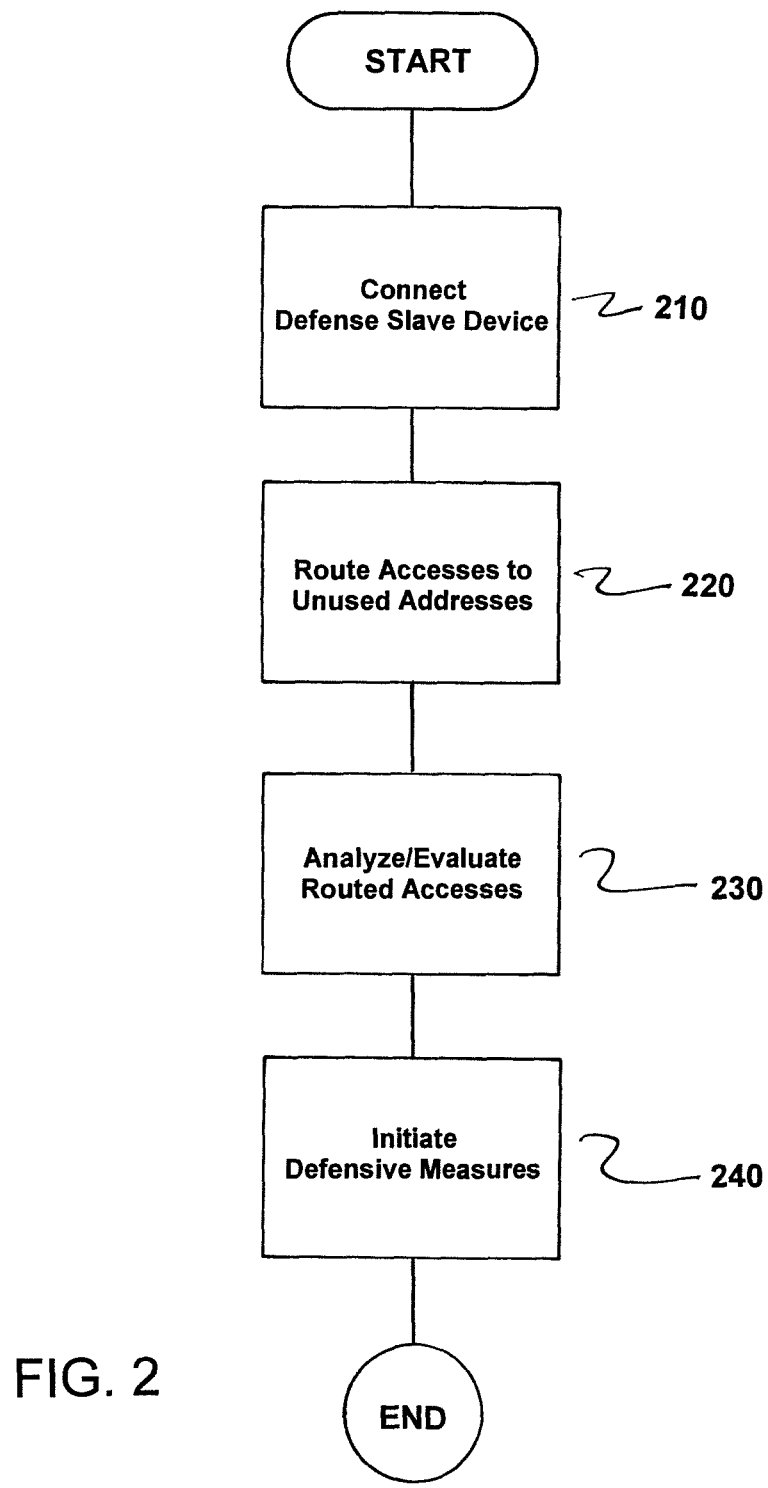
FIG. 2 is a flowchart of the method in accordance with the invention.

FIG. 2 is a flowchart of a method for protecting an integrated electronic circuit against scanning of an address space, where the electronic circuit includes at least one master device (M1 to Mn), at least one slave device (S1 to Sn) and a bus system (NoC), where accesses (ZA) from the at least one master device (M1 to Mn) to the at least one slave device (S1 to Sn) occur via the bus system (NoC) using an address from the address space, and where the address space is used in accordance with functions of the integrated electronic circuit.

The method comprises connecting (1) a defense slave device (DS) to the bus system (NoC) of the integrated electronic circuit, as indicated in step 210. Next, accesses (ZA) to unused addresses of the address space are routed (2) to the defense slave device (DS), as indicated in step 220. The routed accesses (ZA) to the unused addresses of the address space are now analyzed and evaluated (3) by the defense slave device (DS), as indicated in step 230. Next, defensive measures in accordance with the analysis result and the type of access are initiated (4) by the defense slave device (DS), as indicated in step 240.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for protecting an integrated electronic circuit against scanning of an address space, wherein the electronic circuit comprises at least one master device, at least one slave device and a bus system, wherein accesses from the at least one master device to the at least one slave device occur via the bus system using an address from the address space, and wherein the address space is used in accordance with functions of the integrated electronic circuit, the method comprising:
   connecting a defense slave device to the bus system of the integrated electronic circuit;
   routing accesses to unused addresses of the address space to the defense slave device;
   analyzing and evaluating, by the defense slave device, the routed accesses to the unused addresses of the address space; and
   initiating, by the defense slave device, defensive measures in accordance with an analysis result and a type of access to rapidly detect unauthorized accesses to the integrated electronic circuit to protect the integrated electronic circuit against improper scanning of the address space, the defensive measures being configured to at least one of (i) impede or terminate address space scans and (ii) render information obtained by the address space scans unusable;
   wherein the defense slave device returns the integrated electronic circuit to a defined initial state as a defensive measure during a start-up procedure based on the analysis result.

2. The method as claimed in claim 1, wherein for an analysis of the accesses, the defense slave device evaluates at least one of (i) a number of accesses to unused addresses, (ii) a number of accesses within a defined time period and (iii) patterns of accesses.

3. The method as claimed in claim 2, wherein the defense slave device returns the integrated electronic circuit to a defined initial state as a defensive measure during a start-up procedure based on the analysis result.

4. The method as claimed in claim 1, wherein the defense slave device at least one of (a) sends messages comprising one of (i) interrupt requests or (ii) specific reset requests to at least one of (i) master devices and (ii) slave devices of the integrated electronic circuit as defensive measures during operation based on the analysis result or (b) disables specific functions of the integrated electronic circuit as the defensive measures during operation based on the analysis result.

5. The method as claimed in claim 2, wherein the defense slave device at least one of (a) sends messages comprising one of (i) interrupt requests or (ii) specific reset requests to at least one of (i) master devices and (ii) slave devices of the integrated electronic circuit as defensive measures during operation based on the analysis result or (b) disables specific functions of the integrated electronic circuit as the defensive measures during operation based on the analysis result.

6. The method as claimed in claim 1, wherein the defense slave device responds to accesses in accordance with the particular type of access as a defensive measure.

7. A circuit arrangement for protecting an integrated electronic circuit against scanning of an address space, comprising:
   at least one master device;
   at least one slave device; and a bus system interconnecting the at least one master device and the at least one slave device;

a defense slave device connected to the bus system, accesses to unused address areas of the address space being routable to the defense slave device, the defense slave device being configured to analyze and evaluate the accesses and being further configured to initiate defensive measures in accordance with an analysis result and a particular type of access to rapidly detect unauthorized accesses to the integrated electronic circuit to protect the an integrated electronic circuit against improper scanning of the address space, the defensive measures being configured to at least one of (i) impede or terminate address space scans and (ii) render information obtained by the address space scans unusable;

wherein the defense slave device returns the integrated electronic circuit to a defined initial state as a defensive measure during a start-up procedure based on the analysis result.

8. The circuit arrangement as claimed in claim 7, wherein the defense slave device is further configured to at least on of (i) send messages comprising interrupt requests or specific reset requests and (ii) disable specific functions of the integrated electronic circuit and reset the integrated electronic circuit to a defined initial state as the defensive measures.

9. The circuit arrangement as claimed in claim 7, wherein the defense slave device is further configured to respond to accesses in accordance with the particular type of access.

10. The circuit arrangement as claimed in claim 8, wherein the defense slave device is further configured to respond to accesses in accordance with the particular type of access.

11. The circuit arrangement as claimed in claim 7, wherein the bus system comprises a network-on-chip bus system.

12. The circuit arrangement as claimed in claim 8, wherein the bus system comprises a network-on-chip bus system.

13. The circuit arrangement as claimed in claim 9, wherein the bus system comprises a network-on-chip bus system.

* * * * *